2,997,482
PURIFICATION OF DEHYDROACETIC ACID
Ernest Cecil Craven, Hedon, England, assignor to The Distillers Company Limited, Edinburgh, Scotland, a British company
No Drawing. Filed Jan. 25, 1960, Ser. No. 4,180
Claims priority, application Great Britain Feb. 11, 1959
11 Claims. (Cl. 260—343.5)

The present invention relates to the purification of dehydroacetic acid.

Dehydroacetic acid, a known antimycotic agent, may be prepared by dimerising diketene in a solvent. The product, however, may contain impurities giving the dehydroacetic acid an objectionable odour or colour before or after being distilled. Impurities may also be present which render yellow the sodium salt of distilled dehydroacetic acid.

The present invention is a proces of purifying impure dehydroacetic acid which comprises melting the dehydroacetic acid, contacting the molten dehydroacetic acid with a mixture of an inert gas and the vapour of an aromatic hydrocarbon, and cooling the resulting mixture of inert gas, hydrocarbon vapour and vaporised dehydroacetic acid to form a solution of dehydroacetic acid in the aromatic hydrocarbon.

The inert gas is a gas or vapour which does not react substantially with dehydroacetic acid and is otherwise stable during the process of the invention. The inert gas is preferably nitrogen or carbon dioxide, but other gases or vapours, such as hydrogen, methane, helium or argon, may also be used. Preferably no molecular oxygen is present in the inert gas. A single inert gas or an inert mixture of inert gases may be used in the process.

The aromatic hydrocarbon is one which does not react substantially with dehydroacetic acid and is otherwise stable during the process of the invention. The aromatic hydrocarbon preferably has a boiling point at atmospheric pressure in the range from 50° to 140° C. and may be, for instance, benzene, toluene or xylene, toluene or xylene being particularly preferred.

The molten dehydroacetic acid which is contacted with the mixture of an inert gas and the vapour of an aromatic hydrocarbon is preferably maintained at a temperature from 100° to 200° C., a temperature from 120° to 180° C. being particularly preferred.

The resulting mixture of gas and vapours, consisting of the inert gas, the hydrocarbon vapour and vaporised dehydroacetic acid, is cooled to form a solution of dehydroacetic acid in the aromatic hydrocarbon. The dehydroacetic acid may be recovered from this solution, if desired. The proportions of dehydroacetic acid and aromatic hydrocarbon are conveniently such that purified dehydroacetic acid is precipitated from the solution on cooling.

The invention is preferably carried out at substantially atmospheric pressure. The invention may be carried out continuously by melting the dehydroacetic acid, contacting the molten dehydroacetic acid with a mixture of an inert gas and the vapour of an aromatic hydrocarbon, cooling the resulting mixture of inert gas, hydrocarbon vapour and vaporised dehydroacetic acid to form a solution of dehydroacetic acid in the aromatic hydrocarbon, and recycling the inert gas to be contacted with further impure dehydroacetic acid and an aromatic hydrocarbon. The aromatic hydrocarbon may be similarly recycled, if desired, by a process which comprises recovering and vaporising at least some from the solution of dehydroacetic acid formed, mixing the recovered and vaporised aromatic hydrocarbon with an inert gas and contacting the mixture with more of the molten dehydroacetic acid.

The following examples illustrate the invention.

Example 1

1000 grams of dehydroacetic acid containing odorising and colorising impurities were heated with 500 grams of toluene in a two-litre reactor. When the temperature of the vapour in the reactor reached 110° C., nitrogen was passed in at the base of the reactor and dispersed into the reactor contents at the rate of 300 litres per hour. Toluene was also passed in at the base of the reactor at the rate of one litre per hour. The contents of the reactor were heated at 168° to 175° C. for 3 hours. The mixture of dehydroacetic acid, toluene and nitrogen was passed from the reactor through a line heated at 80° C. to a separating funnel, in which the vapour was separated, and passed to a condenser and receiver.

354 grams of dehydroacetic acid were obtained, 220 grams being recovered as a highly pure white crystalline solid by cooling the condensate in the receiver and 134 grams being recovered by further treatment of the mother liquor.

A similar result is achieved if benzene or xylene is used instead of toluene or if carbon dioxide is used instead of nitrogen.

Example 2

The procedure described in Example 1 was repeated with toluene and nitrogen feed rates of 1.2 litres per hour and 400 litres per hour respectively. The contents of the reactor were maintained at 160° to 179° C. for 3 hours.

440 grams of dehydroacetic acid were recovered from the condensate in the receiver as a highly pure white crystalline solid.

Example 3

The procedure described in Example 1 was repeated except that 450 grams of dehydroacetic acid were distilled from the reactor during the 3 hours of heating. 450 grams more of the impure dehydroacetic acid were then fed to the reactor and the procedure was repeated.

By a series of such repeats, 5000 grams of the impure dehydroacetic acid were fed to the reactor from which 4500 grams were distilled. Approximately 70% of the dehydroacetic acid present in the distillate crystallised on cooling.

I claim:

1. A process of purifying impure dehydroacetic acid which comprises melting the dehydroacetic acid, intimately admixing the molten dehydroacetic acid with an inert gas and with the vapour of an aromatic hydrocarbon, and cooling the resulting mixture of inert gas, hydrocarbon vapour and vaporised dehydroacetic acid to form a solution of dehydroacetic acid in the aromatic hydrocarbon.

2. A process claimed in claim 1 wherein the molten dehydroacetic acid which is admixed with the inert gas and with the vapour of an aromatic hydrocarbon is maintained at a temperature from 100° to 200° C.

3. A process claimed in claim 1 wherein the molten dehydroacetic acid which is admixed with the inert gas and with the vapour of an aromatic hydrocarbon is maintained at a temperature from 120° to 180° C.

4. A process claimed in claim 1 wherein purified dehydroacetic acid is recovered from the solution in the aromatic hydrocarbon.

5. A process claimed in claim 1 wherein the proportions of dehydroacetic acid and the aromatic hydrocarbon are such that purified dehydroacetic acid is precipitated from the solution on cooling.

6. A process of purifying impure dehydroacetic acid which comprises melting the dehydroacetic acid, intimately admixing the molten dehydroacetic acid with an inert gas and with the vapour of an aromatic hydrocarbon, cooling the resulting mixture of inert gas, hydrocarbon vapour and vaporised dehydroacetic acid to form a solution of dehydroacetic acid in the aromatic hydrocarbon, and recycling the inert gas to be contacted with further impure dehydroacetic acid and an aromatic hydrocarbon.

7. A process of purifying impure dehydroacetic acid which comprises melting the dehydroacetic acid, intimately admixing the molten dehydroacetic acid with a mixture of an inert gas and the vapour of an aromatic hydrocarbon, cooling the resulting mixture of inert gas, hydrocarbon vapour and vaporised dehydroacetic acid to form a solution of dehydroacetic acid in the aromatic hydrocarbon, recovering and vaporising at least some of the aromatic hydrocarbon and contacting the recovered and vaporised aromatic hydrocarbon with further impure dehydroacetic acid and an inert gas.

8. A process claimed in claim 1 wherein the inert gas is selected from the group consisting of nitrogen and carbon dioxide.

9. A process claimed in claim 1 wherein the aromatic hydrocarbon has a boiling point at atmospheric pressure in the range from 50° to 140° C.

10. A process claimed in claim 9 wherein the aromatic hydrocarbon is selected from the group consisting of benzene, toluene and xylene.

11. A process claimed in claim 1 wherein the molten dehydroacetic acid is preliminarily dissolved in part of the aromatic hydrocarbon.

No references cited.